(12) United States Patent
Zhang

(10) Patent No.: US 11,347,277 B2
(45) Date of Patent: May 31, 2022

(54) DISPLAY ASSEMBLY AND ELECTRONIC DEVICE USING SIGNAL REFLECTION FOR USER

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 71 days.

(21) Appl. No.: 16/557,529

(22) Filed: Aug. 30, 2019

(65) Prior Publication Data

US 2020/0073447 A1    Mar. 5, 2020

(30) Foreign Application Priority Data

Aug. 31, 2018    (CN) .......................... 201811019871.2

(51) Int. Cl.
*G06F 1/16*    (2006.01)
*F21V 8/00*    (2006.01)
(Continued)

(52) U.S. Cl.
CPC .......... *G06F 1/1684* (2013.01); *G02B 6/0055* (2013.01); *G06F 1/1626* (2013.01);
(Continued)

(58) Field of Classification Search
CPC ... G06F 1/1684; G06F 1/1626; G02B 6/0055; G02B 7/02; G02B 7/006; G02B 6/0051;
(Continued)

(56) References Cited

U.S. PATENT DOCUMENTS

2010/0208953 A1* 8/2010 Gardner ............ G06K 9/00006
                                                                382/124
2017/0351901 A1   12/2017 Kim et al.
(Continued)

FOREIGN PATENT DOCUMENTS

CN           103902955 A      7/2014
CN           205750810 U     11/2016
(Continued)

OTHER PUBLICATIONS

Search Report for the corresponding EP patent application No. 19194968.4, dated Nov. 27, 2019.
(Continued)

*Primary Examiner* — Abhishek Sarma
(74) *Attorney, Agent, or Firm* — Perkins Coie LLP

(57) ABSTRACT

The present disclosure relates to a display assembly, a method of using the display assembly, and an electronic device, which uses the display assembly, for detecting an identification surface of an object (e.g., a fingerprint) using a detection signal, which penetrates the object and reflects a target signal representative of at least part of the identification surface (e.g., the orthographic projection of the fingerprint) onto an identification area on a display. A signal receiver (i.e., comprising a signal receiver) then detects the target signal. The target signal can be used by a processor to further authenticate whether it corresponds to an authorized user. The display assembly includes a display having an identification area, a signal transmitter (i.e., comprising a signal transmitter) configured to generate a detection signal when an object is within a preset distance of the identification area, and a signal receiver configured to detect the target signal.

24 Claims, 18 Drawing Sheets

(51) Int. Cl.
*G06V 40/13* (2022.01)
*G06V 40/12* (2022.01)
*G02B 7/02* (2021.01)
*G02B 7/00* (2021.01)

(52) U.S. Cl.
CPC ...... *G06V 40/1318* (2022.01); *G06V 40/1365* (2022.01); *G02B 7/006* (2013.01); *G02B 7/02* (2013.01)

(58) Field of Classification Search
CPC .... G06K 9/00087; G06K 9/0004; G06K 9/22; G02F 1/133615; G02F 2201/58; G06V 40/1318; G06V 40/1365; G06V 10/17
See application file for complete search history.

(56) References Cited

U.S. PATENT DOCUMENTS

2018/0005005 A1  1/2018  He et al.
2018/0293422 A1* 10/2018  Ling ...................... H05B 45/20

FOREIGN PATENT DOCUMENTS

| CN | 106444998 A | 2/2017 |
|---|---|---|
| CN | 206331451 U | 7/2017 |
| CN | 107102693 A | 8/2017 |
| CN | 107193412 A | 9/2017 |
| CN | 107590422 A | 1/2018 |
| CN | 207182353 U | 4/2018 |
| CN | 108388847 A | 8/2018 |
| CN | 109270988 A | 1/2019 |

OTHER PUBLICATIONS

International search report for PCT/CN2019/104054, dated Nov. 27, 2019.
CNIPA, First Office Action for Chinese Patent Application No. 201811019871.2, dated Mar. 3, 2021. 20 pages with English translation.
SIPO, Second Office Action for CN Application No. 201811019871.2, dated Sep. 29, 2021. 17 pages with English translation.
IPI, Examination Report for Indian Patent Application No. 201914035274, dated Jul. 5, 2021. 5 pages with English translation.
CNIPA, Decision of Rejection for CN Application No. 201811019871.2, dated Mar. 24. 2022. 18 pages with English translation.

* cited by examiner

DISPLAY ASSEMBLY AND ELECTRONIC DEVICE USING SIGNAL REFLECTION FOR USER

CROSS-REFERENCE TO RELATED APPLICATIONS

This application claims priorities to Chinese Patent Application No. 201811019871.2, filed on Aug. 31, 2018, the entirety of which is incorporated by reference herein.

TECHNICAL FIELD

The present disclosure relates to the field of electronic technologies, and in particular, to a display assembly and an electronic device using signal reflection for user.

BACKGROUND

Fingerprint identification technology is one of the main biometric identification technologies used to unlock modern electronic devices. However, the recognition accuracy of fingerprint identification may be substantially degraded by environmental factors, such as if an object to be identified is too wet (surface of the object has much water or grease), an object to be identified is too dry (the object lacks water), or an object to be identified is in low temperature (temperature of the object is lower than the normal temperature) and the like, which lead to a low recognition accuracy. Therefore, a solution is needed to improve the recognition accuracy of biometric identification that is minimally impacted by environmental factors, such as those mentioned above.

SUMMARY

Embodiments of the present disclosure provide a display assembly and an electronic device with the display assembly.

According to one aspect of the present disclosure, a display assembly is provided. The display assembly may include a display, a signal transmitter, and a signal receiver. The display defines an identification area. The signal transmitter is positioned on a first side of the display and configured to, when the object is within a preset distance of the identification area from a second side of the display, generate, in a direction of the object, a detection signal operable to penetrate the object and reflect a target signal representative of at least part of the identification surface on the identification area. The signal receiver is adjacent to the signal transmitter and configured to, when the target signal is reflected on the identification area, detect the target signal.

According to another aspect of the present disclosure, a method for detecting an identification surface of an object using the aforementioned display assembly or electronic device is provided. The steps of the method include: 1) when an object is within a preset distance of the identification area of a display, generating a detection signal using a signal transmitter, the detection signal should be able to penetrate the object and reflect a target signal representative of at least part of the identification surface (such as the orthographic projection of a fingerprint) onto the identification area; and 2) detecting the target signal with a signal receiver.

According to yet another aspect of the present disclosure, an electronic device is provided. The electronic device includes a display assembly. The display assembly may include a display, a signal transmitter, and a signal receiver. The display defines an identification area. The signal transmitter is positioned on a first side of the display and configured to, when the object is within a preset distance of the identification area from a second side of the display, generate, in a direction of the object, a detection signal operable to penetrate the object and reflect a target signal representative of at least part of the identification surface on the identification area. The signal receiver is adjacent to the signal transmitter and configured to, when the target signal is reflected on the identification area, detect the target signal.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

In order to facilitate the understanding of the present disclosure, the present disclosure will be described more fully hereinafter with reference to the accompanying drawings.

Figure 1:
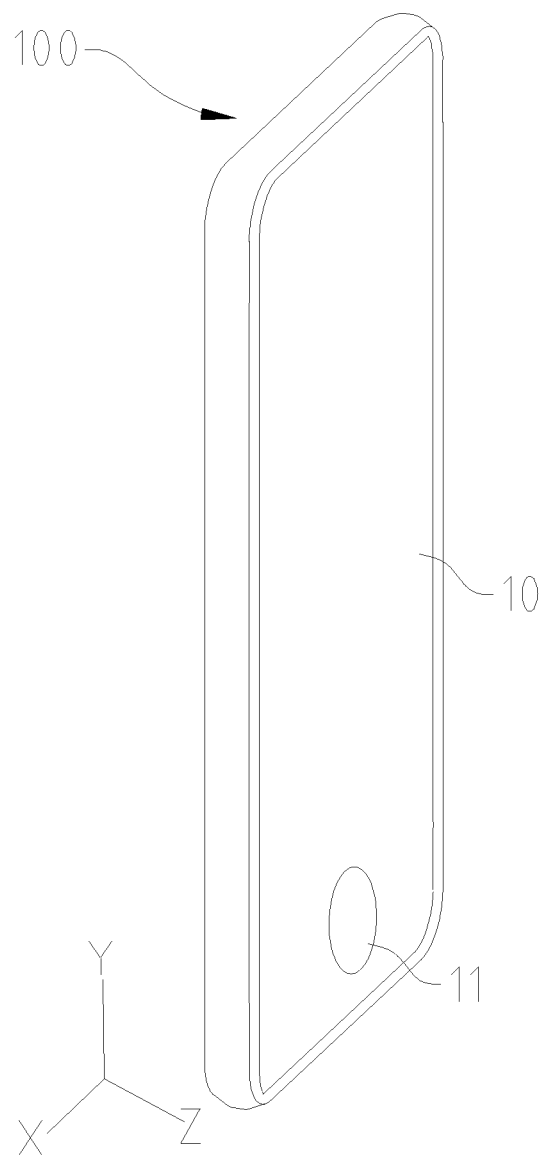
FIG. 1 is an external structural schematic view of an electronic device according to an embodiment, the electronic device includes a display assembly.

FIG. 1 illustrates an electronic device 100 according to an embodiment, the electronic device includes a display assembly. The electronic device 100 includes a display assembly 10 and an identification area 11. The display assembly 10 is used for displaying images, controlling touch-screen, identifying fingerprint, etc. The electronic device 100 can be an electronic device with display function, such as a mobile phone, a laptop, a personal digital assistant (PDA), an e-reader, a television, a smart appliance, a wearable device, a car monitor, and the like, and may not be limited herein. For ease of description, the present disclosure defines Y to describe a length direction of the electronic device 100, X to describe a width direction of the electronic device 100, and Z to describe a depth direction of the electronic device 100.

Figure 2:
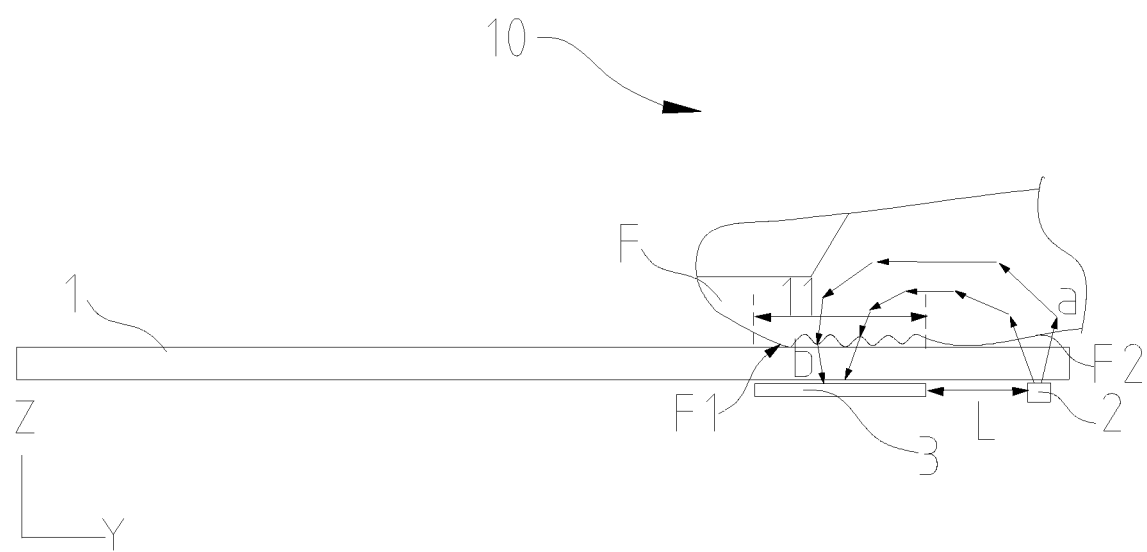
FIG. 2 is a cross-section view of the display assembly of FIG. 1.

FIG. 2 illustrates the display assembly 10 according to an embodiment of the present disclosure. The display assembly 10 is configured to identify an identification surface of an object F The display assembly 10 includes a display 1, a signal transmitter 2, and a signal receiver 3. The signal transmitter 2 and the signal receiver 3 are located on a side of the display 1 away from the object F The display 1 has an identification area 11 (shown in FIG. 1). Identifying information based on signature characteristics of the object F is projected onto the identification area 11. For example, when the electronic device 100 is operated by a user and an identification surface F1 of the object F is placed upon the identification area 11 of the display 1, identifying information extracted from the identification surface F1 of the object F can be identified using the signal receiver 3. To initiate the identification process, the identification surface F1 may be touching or simply be in proximity of the identification area 11. The identification surface F1 can be a surface of a finger, a surface of a palm, a surface of finger joint, a surface of an ear, and the like.

In FIG. 2, the signal transmitter 2 and the identification area 11 are set apart with each other. The signal transmitter 2 is generated a detection signal "a". The detection signal "a" is transmitted into the object F and exited from the identification surface F1 of the object F The detection signal "a" exited from the identification surface F1 of the object F is converted to target signal "b" with fingerprint information of the signature characteristics of the identification surface F1.

Figure 3:
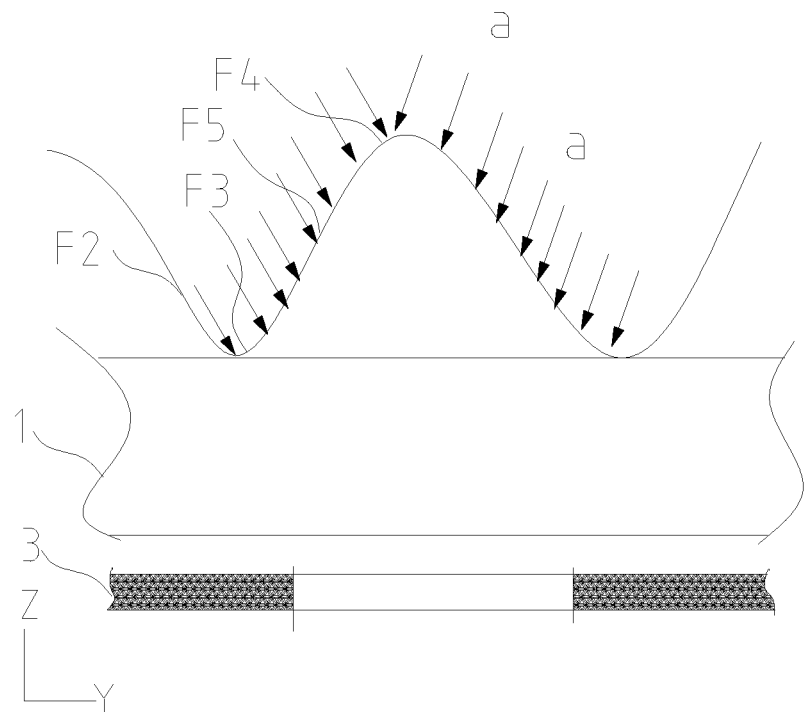
FIG. 3 is an enlarged partial view of the display assembly of FIG. 2.

Referring to FIG. 3, the identification surface F1 includes at least one ridge region F3, at least one valley region F4, and transition surface F5 between the ridge region F3 and the valley region F4. When the detection signal "a" enters into an identification surface F1, most of the detection signal "a" exits from a transition surface F5, giving the valley region F4 a higher signal strength than the ridge region. As such, the target signal "b" expresses the contours of the ridge region F3 and the valley region F4 in the form of having higher signal strength where there are ridge regions F3 and lower signal strength where there are valley regions F4.

Referring to FIG. 2, the signal receiver 3 and the identification area 11 are set to face each other. The signal receiver 3 is configured to receive the detection signal "a" as it exits from the identification surface F1 of the object F. That is, the identification area 11 is located between the identification surface F1 and the signal receiver 3, the target signal "b" is projected from the identification surface F1 to the signal receiver 3. The signal receiver 3 receives and processes the target signal "b" to extract identifying information from the identification surface.

In one embodiment of the present disclosure, the signal receiver 3 is directly facing to the identification area 11. The identification area 11 fully covers a signal receiving area of the signal receiver 3, which is oriented in a direction towards an incoming target signal "b", which represents an orthographic projection of the identification surface that has been projected onto the identification area 11.

In another embodiment of the present disclosure, the identification area 11 is partially coincided with the signal receiver 3 in orthographic projection of the signal receiver 3. Or, the identification area 11 cannot be coincided with the signal receiver 3 in orthographic projection of the signal receiver 3.

In related arts, when the identification surface F1 touch the identification area 11, the ridge region F3 is in contact with the identification area 11 while a gap is left between the valley region F4 and the identification surface 11. Signal is projected from the identification area 11 to the identification surface F1 and reflected to the signal receiver 3 by the identification surface F1. During fingerprint identification, cause of the valley region F4 of the identification surface F1 has air gap with the identification area 11, which makes the signal receiver 3 to be received different signal strengths from the ridge region F3 and the valley region F4 of the identification surface F1. However, when the identification surface F1 is dry, the ridge region F3 of the identification surface F1 cannot totally touch the identification area 11, the ridge region F3 of the identification surface F1 may have air gap with the identification area 11. As a result, the signal strength received by the signal receiver 3 cannot accurately reflect the ridge region F3 and the valley region F4 of the identification area 11, which leads to the low accuracy of fingerprint identification.

In the present disclosure, the signal transmitter 2 and the signal receiver 3 are located in the display assembly 10. When the detection signal "a" shot from the signal transmitter 2 is exited from the display 1, the detection signal "a" is reflected in the object F and exited from the identification surface F1 of the object F. The detection signal "a" is refracted in the valley regions F4 and the ridge regions F3 to produce different signal strength, which can reflect the fingerprint information of the identification surface F1. The fingerprint information of the identification surface F1 is obtained by refracting the detection signal "a" in the valley regions F4 and the ridge regions F3, the process of fingerprint identification is not affected by environmental factors such as wetness, dryness and problems of the object F to be identified. The fingerprint identification provided in the present disclosure can avoid the problem of low accuracy of fingerprint identification in dry finger, thereby improving the success rate of fingerprint identification. That is, in the present disclosure, the fingerprint identification can be exactly identified without the identification surface F1 touch the identification area 11.

In some embodiments, the detection signal "a" can be infrared light. When the detection signal "a" is infrared light, the wavelength of the detection signal "a" can be 800 to 900 nm. In other embodiments, the detection signal "a" can be visible light, ultraviolet light, ultrasonic signal, etc.

In some embodiments, when the detection signal "a" is infrared light, the signal transmitter 2 can be an infrared light emitting diode or an infrared light emitting triode, and the like, and the signal receiver 3 can be an infrared light emitting diode.

When the detection signal "a" is invisible light such as infrared light, ultraviolet light, and the like, which can reduce the influence of the transmission of detection signal "a" and the reception of target signal "b" on the display function of display 1.

In the illustrated embodiment of the present disclosure, the display assembly 10 may be a liquid crystal display screen or an organic light emitting diode display screen.

Figure 4:
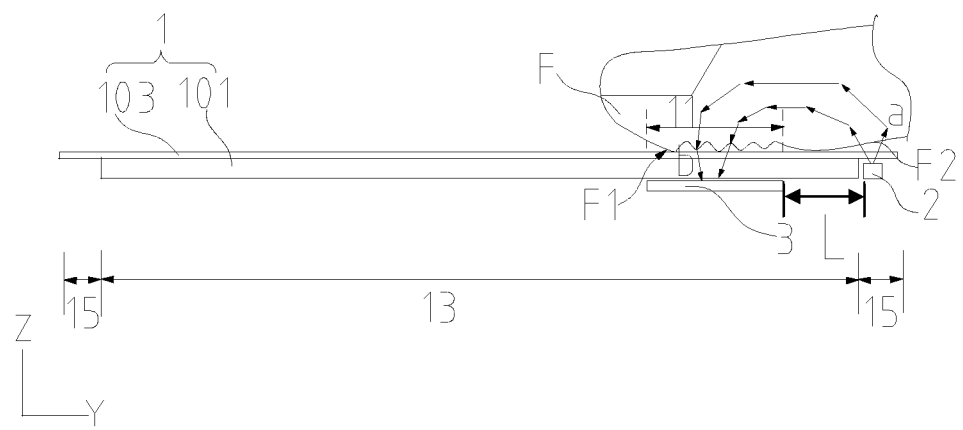
FIG. 4 is another cross-section view of an embodiment of the display assembly of FIG. 1.

Referring to FIG. 4, the display 1 includes a first area 13 and a second area 15 surrounding the first area 13. The first area 13 is a display area, and the second area 15 is a non-display area. The first area 13 may be an area formed by an electronic element having a luminescent display function, so that the first area 13 has functions of display images. The display 1 further includes a display component 101 and a cover 103. The display component 101 is configured to display images. The cover 103 may be made of transparent or translucent material. The display component 101 and the signal transmitter 2 is parallel to each other. The cover 101 covers the display component 101 and the signal transmitter 2. The area of the display component 101 covered by the cover 103 is the first area 13, and the area beyond the display component 101 of the cover 103 is a non-display area 15. In other words, the signal transmitter 2 is located on the second area 15, and the signal receiver 3 is located on the first area 13. The identification area 11 is on the cover 103 and facing to the display component 101. That is, the identification area 11 is located on the first area 13.

The signal transmitter 2 and the identification area 11 are staggered from each other. In other words, the signal transmitter 2 and the identification area 11 may has a preset distance "L" in orientation X, Y, or Z. Because of the preset distance "L", when the detection signal "a" enters into the object F, the detection signal "a" can reflect and refract in the object F many times, and then the detection signal "a" exits from the identification area F1 of the object F. In some embodiments, the signal transmitter 2 and the identification area 11 are staggered from each other in the X-Y plane. In other words, the signal transmitter 2 and the identification area 11 has the preset distance "L" in the X-Y plane. The detection signal "a" enters into an incident area F2 of the object F and exits from the identification area F1 The detection signal "a" can reflect and refract in the object F many times, and then the detection signal "a" exits from the identification area F1 of the object F.

In some embodiments, the preset distance "L" may be 5 to 15 mm.

In some embodiments, the display component 101 may be an organic light emitting display (OLED), which includes a substrate, an anode, a luminescent layer, a cathode and a packaging layer. In other embodiments, the display component 101 may be liquid crystal display (LCD), which includes a backlight module, a thin film transistor array substrate, a liquid crystal layer and a color film substrate, etc.

In some embodiments, the signal receiver 3 and the identification area 11 are placed in the first area 13, the identification surface F1 of the object F is identified by nearing to or touching the identification area 11 on the first area 13. In this example, because the identification surface 11 is not placed on the second area 15, the size of the second area 15 can be reduced, thereby increasing the screen proportion of the display.

Figure 5:
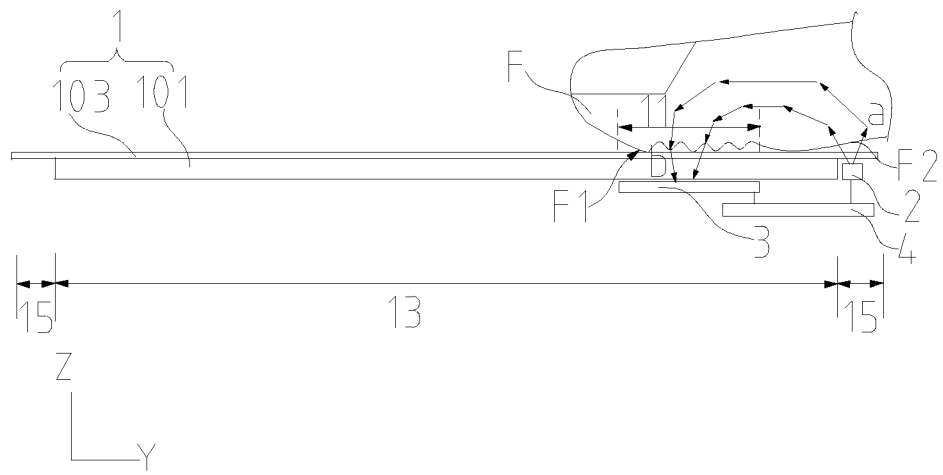
FIG. 5 is another cross-section view of an embodiment of the display assembly of FIG. 1.

In other embodiments, referring to FIG. 5, the display assembly 10 further includes a processor 4. The processor 4 is electrically connected to the signal transmitter 2 and the signal receiver 3. The processor 4 controls the signal transmitter 2 to produce the detection signal "a" and the signal receiver 3 to receive the target signal "b" when it is needed to identify fingerprint. For reducing energy loss of the signal transmitter 2 and the signal receiver 3, the processor 4 also controls the signal transmitter 2 not to produce the detection signal "a" and the signal receiver 3 not to receive the target signal "b" when it does not need to make an identification, thereby reducing the energy loss of the display assembly 10.

Figure 6:
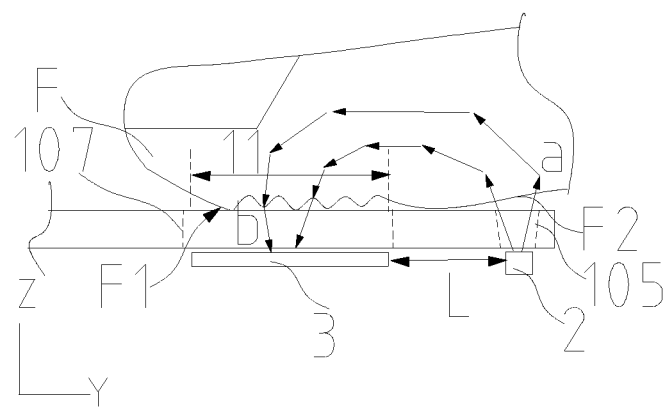
FIG. 6 is a cross-section view of an embodiment of the display assembly.

In one embodiment of the present disclosure, referring to FIG. 6, the display assembly 10 defines a radiating channel 105 and a receiving channel 107. The radiating channel 105 is located between the signal transmitter 2 and the cover 103 to produce the detection signal "a". The receiving channel 107 is located between the signal receiver 3 and the identification area 11 to direct the target signal "b" into the receiving channel 107. It should be understood that, when the detection signal "a" is infrared light, the radiating channel 105 and the receiving channel 107 have high transmittance for infrared light. It should be understood that, when the detection signal "a" is infrared light, the receiving channel 107 can be at least one of a through-hole, an aperture, or an infrared transmission channel.

The radiating channel 105 and the receiving channel 107 in the display assembly 10 can transmit the detection signal "a" and the target signal "b". So that, the transmission channels of the radiating channel 105 and the receiving channel 107 are independent, to reduce interference between the detection signal "a" and the target signal "b". The target signal "b" occupies a large proportion of the signals received by the signal receiver 3, which improves the accuracy of fingerprint identification.

In FIG. 6, the identification area 11 is partially coincided with the signal receiver 3 in orthographic projection of the signal receiver 3. The identification area 11 is directly faced to the signal receiver 3 to make the path of receiving channel 107 is shortest, and reduce the energy loss of target signal "b" in receiving channel 107.

Figure 7:
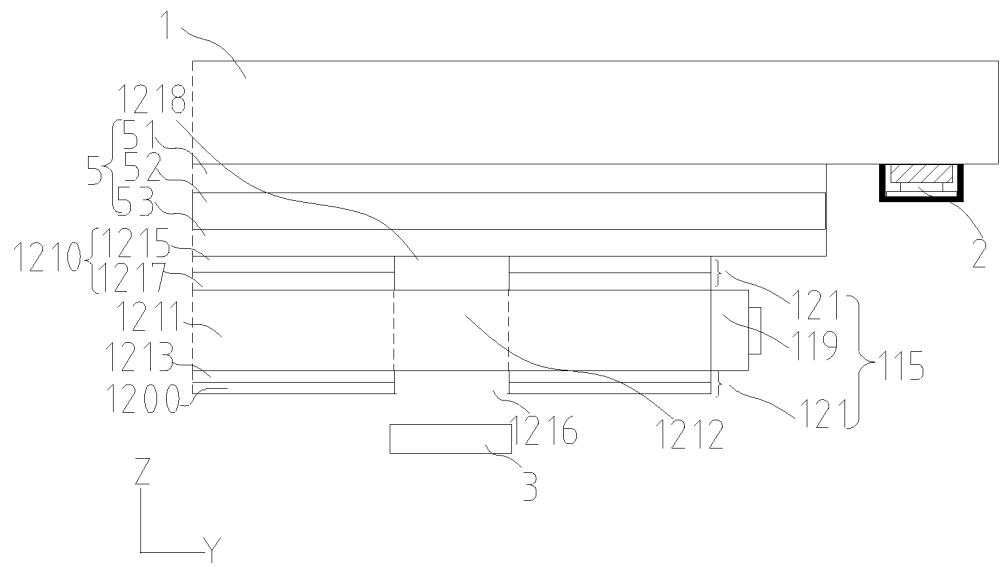
FIG. 7 is a cross-section view of another display assembly of first embodiment.

Referring to FIG. 7, in one embodiment of the present disclosure, the display assembly 10 includes a backlight module 115. The signal receiver 3 is located on one side of the backlight module 115 away from the cover 103. Due to the signal receiver 3 does not destroy the structure of the display 1, thereby reducing effect of the signal receiver 3 on display function of display 1. In other words, the display 1 is stacked on the signal receiver 3, the receiving channel 107 is in the display 1 to make the target signal "b" to be received by the signal receiver 103 through the receiving channel 107. The display 1 and the signal receiver 3 can be produced separately. The display 1 and the signal receiver 3 are easy to assemble and operate.

It should be understood that, in FIG. 7, the display assembly 10 further includes a liquid crystal display (LCD) module 5. The LCD module 5 is located between the display 1 and the backlight module 115. The target signal "b" passes through the identification area 11, the LCD module 5, and the receiving channel 107, until into the signal receiver 3.

The LCD module 5 includes a color film substrate 51, a liquid crystal layer 52, and thin-film transistor (TFT) array substrate 53. The LCD module 5 cooperates with the backlight module 115 to achieve display function. It should be understood that, the LCD Module 5 has high rate of transmission for target signal "b".

Figure 8:
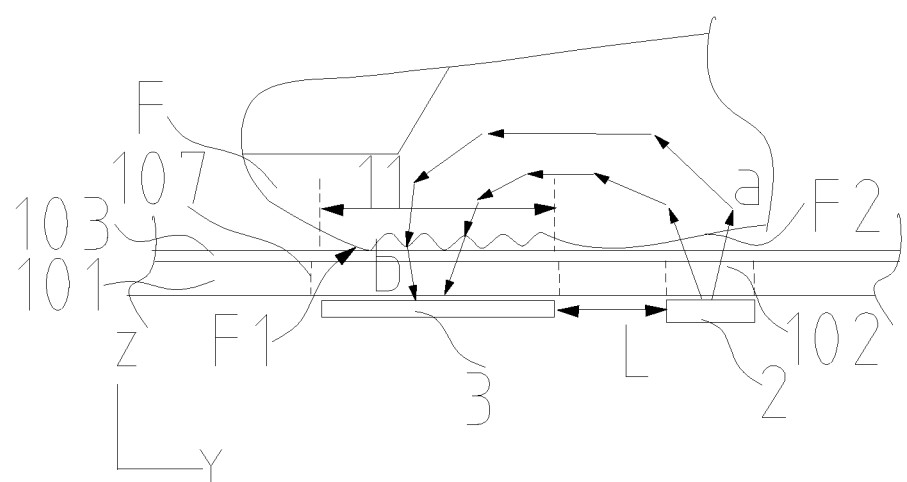
FIG. 8 is a cross-section view of an embodiment of the display assembly.

Referring to FIG. 8, in one embodiment of the present disclosure, the display 1 includes the display component 101 and the cover 103. The display 1 is stacked on the signal receiver 3. The difference between the FIG. 8 and FIG. 7 is that, the signal transmitter 2 and the signal receiver 3 are located on a side of the display component 101 away from the cover 103. A distance between the signal transmitter 2 and the cover 103 is equal to a distance between the signal receiver 3 and the cover 103. The display component 101 defines the receiving channel 107 and a radiating channel 102. The radiating channel 102 is located between the cover 103 and the signal transmitter 2. The radiating channel 102 is configured to transmit the detection signal "a". The receiving channel 107 is located between the identification area 11 and the signal receiver 3. The receiving channel 107 is configured to transmit the detection signal "a" exited from the identification surface F1 of the object F.

Figure 10:
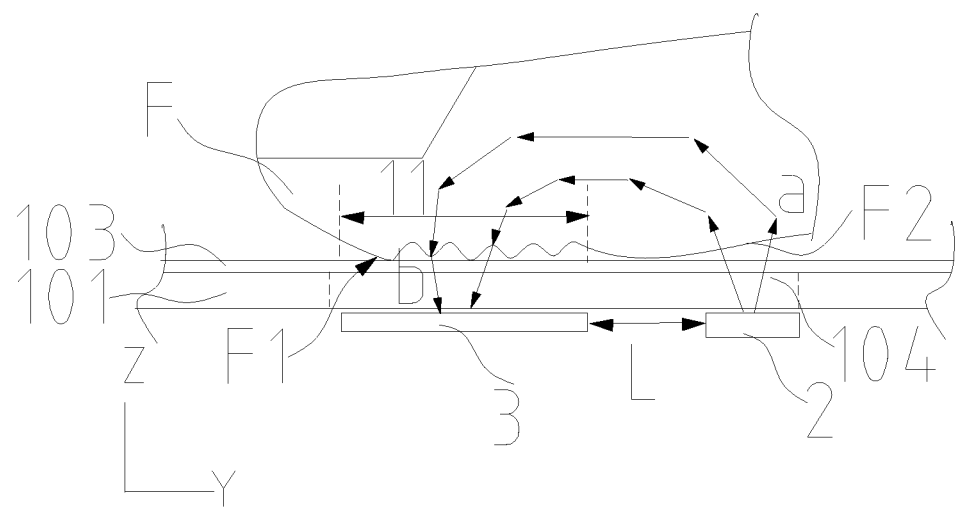
FIG. 10 is a cross-section view of an embodiment of the display assembly.

Referring to FIG. 10, it should be understood that, the display component 101 can be a LCD panel or an organic light emitting diode display panel.

Due to the signal transmitter 2 and the signal receiver 3 are located on the side of the display component 101 away from the cover 103, the signal transmitter 2 and the signal receiver 3 should not occupy the non-display area of the display assembly 10 and increase the screen proportion of the display assembly 10.

Figure 9:
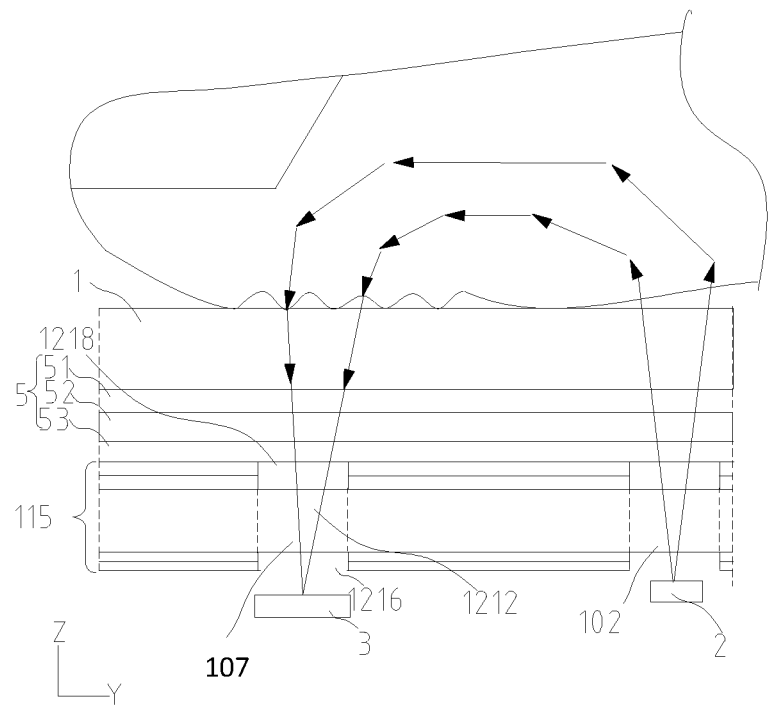
FIG. 9 is a cross-section view of another embodiment of the display assembly.

Referring to FIG. 9, the display component 101 includes the backlight module 115. The radiating channel 102 and the receiving channel 107 are located in the backlight module 115, so that the signal transmitter 2 and the signal receiver 3 can transmit signals through the radiating channel 102 and the receiving channel 107 of the backlight module 115.

In one embodiment of the present disclosure, the structure of the radiating channel 102 may be same with the structure of the receiving channel 107.

Referring to FIG. 10, in one embodiment of the present disclosure, the display 1 includes the display component 101 and the cover 103. The display 1 is stacked on the signal receiver 3. The signal transmitter 2 and the signal receiver 3 are located on a side of the display component 101 away from the cover 103. The difference between the FIG. 10 and FIG. 8 is that, the display component 101 defines a signal transmission channel 104. The signal transmitter 2 shoots the detection signal "a" through the signal transmission channel 104. The signal receiver 3 receives the detection signal "a" exited from the identification surface F1 of the object F through the signal transmission channel 104.

It should be understood that, in FIG. 10, the display component 101 can be a LCD panel or an organic light emitting diode display panel.

The signal transmitter 2 and the signal receiver 3 both use the signal transmission channel 104, which reduce the number of channels and reduce structure changes of the display component 101, thereby reducing effect of the signal receiver 3 on display function of display component 101. Further, the signal transmitter 2 and the signal receiver 3 should not occupy the non-display area of the display assembly 10 and increase the screen proportion of the display assembly 10.

Figure 11:
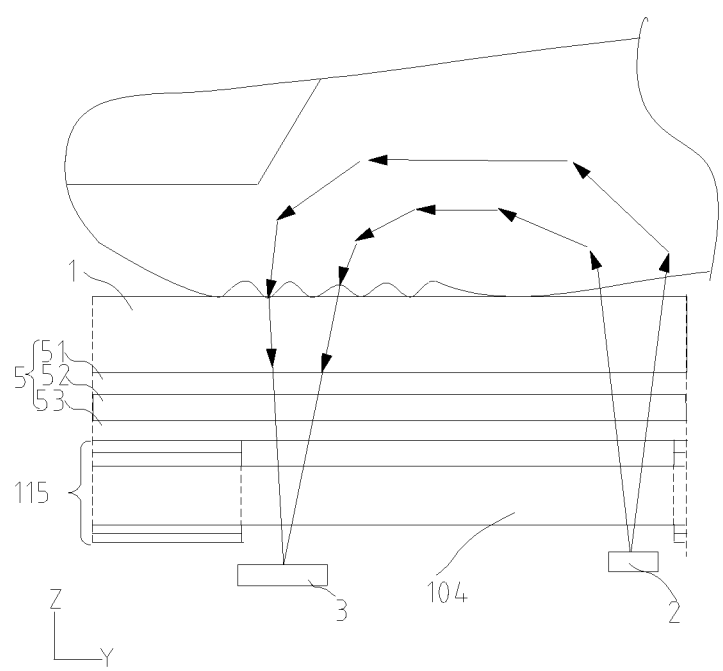
FIG. 11 is a cross-section view of an embodiment of the display assembly.

Referring to FIG. 11, the display component 101 includes the backlight module 115. The signal transmission channel 104 is located in the backlight module 115, so that the signal transmitter 2 and the signal receiver 3 can transmit signals through the signal transmission channel 104 of the backlight module 115.

According to an embodiment of the present disclosure, the structure of the signal transmission channel 104 may be the same as the structure of the receiving channel 107.

Figure 12:
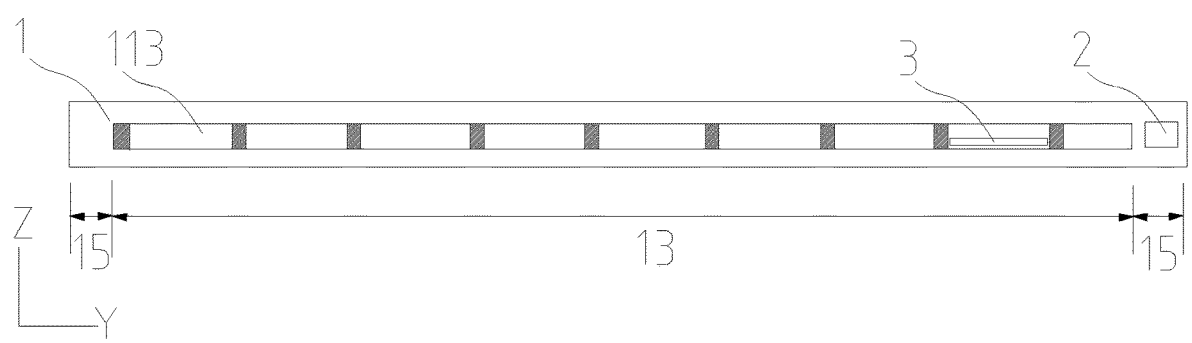
FIG. 12 is a cross-section view of an embodiment of the display assembly.
Figure 13:
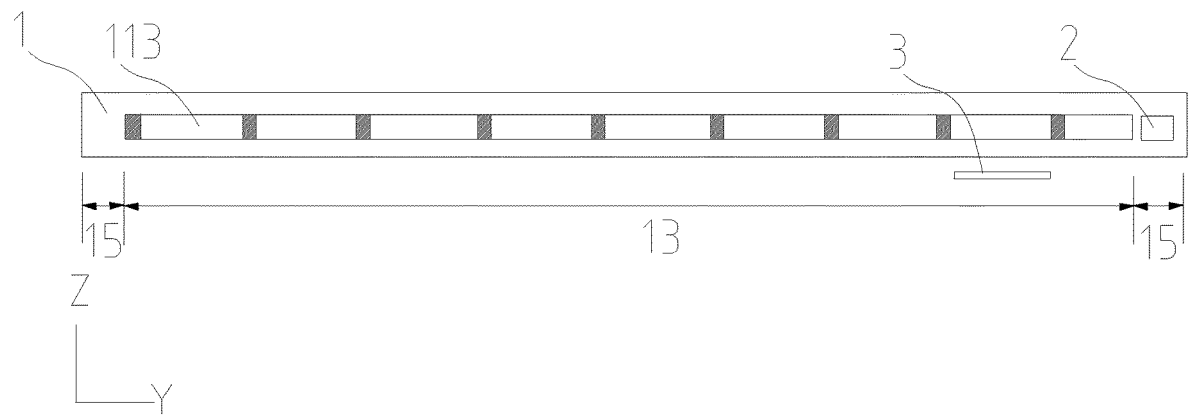
FIG. 13 is a cross-section view of an embodiment of the display assembly.
Figure 14:
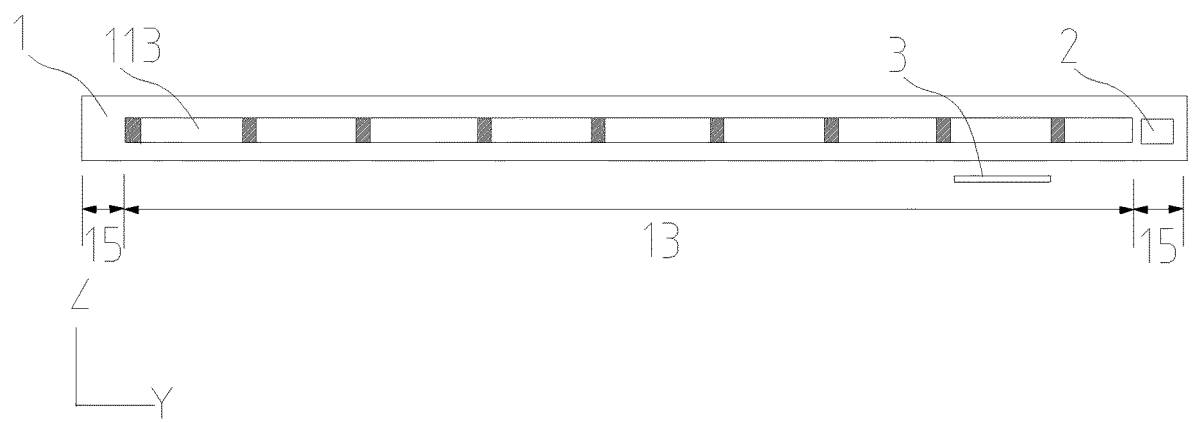
FIG. 14 is a cross-section view of an embodiment of the display assembly.

Referring to FIGS. 12-14, in one embodiment of the present disclosure, the display 1 may be an OLED. The receiving channel 107 may be a pixel area 113. The signal receiver 3 may be located in the pixel area 113 or face to the pixel area 113. The pixel area 113 have high transmittance to the detection signal "a" and the target signal "b" when the detection signal "a" is infrared light, which make the target signal "b" is reflected to the signal receiver 3 through the receiving channel 107. Referring to FIG. 12, the signal receiver 3 is located in the pixel area 113. Alternatively, referring to FIG. 13, the signal receiver 3 can be located in the display 1 and facing the pixel area 113. Alternatively, referring to FIG. 14, the signal receiver 3 can also be placed outside of, where it is stacked on the display 1, and facing the pixel area 113.

In detail, the display 1 includes a plurality of pixel areas 113 arranged in array. The identification area 11 is formed by a plurality group of two adjacent pixel areas 113. For example, the pixel areas 113 in row 10 and column 9 of the array (not shown) could form the identification area 11. Further, there may be a plurality of signal receiver 3, each signal receivers 3 corresponds to a pixel area 113 of the identification area 11.

Referring to FIG. 7, the backlight module 115 includes a light source 119 and an optical assembly 121. The optical assembly 121 is stacked on the cover 103. The signal receiver 3 is located on a side of the optical assembly 121 away from the cover 103. The light source 119 is located surrounding the optical assembly 121 to enable an optical signal from the light source 119 transmit to the cover 103 through the optical assembly 121.

In detail, the optical assembly 121 is configured to transmit the light source 119 from the first area 13 and make the optical signal of the light source 119 in high brightness and uniformity. The light source 119 may be a plurality of light emitting diodes (LEDs). The LEDs are located surrounding the optical assembly 121, so that the LEDs do not occupy space of the optical assembly 121 on a side of the optical assembly 121 facing away from the cover 103. The signal receiver 3 can be located at any position on the side of the optical assembly 121 away from the cover 103. The position of the signal receiver 3 and the position of the light source 119 must be such that they do not interfere with each other.

It should be understood that, in other embodiments, the light source 119 may be located on a side of the optical assembly 121 away from the cover 103 and the signal receiver 3 may be located on a side of the light source 119 away from the optical assembly 121. That is, the optical assembly 121, the light source 119, and the signal receiver 3 are stacked up. The receiving channel 107 (as shown in FIG. 6) passes through the optical assembly 121 and the light source 119. The light source 119 is located at the side of the optical assembly 121 away from the cover 103. Light directly passes through the optical assembly 121 and emits from the display 1, which can improve the brightness of the first area 13 and make the brightness of the first area 13 more uniform.

The optical assembly 121 includes an optical film 1210, a light guiding plate 1211, and a reflecting film 1213. The optical film 1210 is close to the cover 103. The optical film 1210 defines a first through hole 1218. The light guiding plate 1211 defines a path 1212, which is configured to channel the target signal "b". The reflecting film 1213 defines a second through hole 1216. The first through hole 1218, the path 1212, and the second through hole 1216 form the receiving channel 107.

In detail, the optical film 1210 is configured to increase the brightness of the light. The optical film 1210 includes a first film 1217 and a second film 1215. The first film 1217 is configured to make the brightness more uniform and the second film 1215 is configured to reflect the light entering to the display component 101 from the cover 103 to enhance the brightness of the light. The reflecting film 1213 is configured to reflect the light from the light guiding plate 1211 to the optical film 1210.

In some embodiments, the first through hole 1218 and the second through hole 1216 may be circular to form an optical cylinder for the target signal "b" to be received by the signal receiver 3. In other embodiments, the first through hole 1218 and the second through hole 1216 may be elliptical, rectangular, or other shapes.

In addition, the first through hole 1218, the path 1212, and the second through hole 1216 are aligned and connected. The first through hole 1218, the path 1212, and the second through hole 1216 form the receiving channel 107. The receiving channel 107 extends in a straight line to reduce reflection and shielding of the target signal "b" as it passes through the receiving channel 107.

In some embodiments, the size of the second through hole 1216 may be at least as large as the first through hole 1218 in order to further reduce the shielding between the reflecting film 1213 and the target signal "b", and improve transmission of the target signal "b".

In some other embodiments, the backlight module 115 includes a supporting plate 1200. The supporting plate 1200 is located on a side of the reflecting film 1213 opposite the light guiding plate 1211. The supporting plate 1200 is configured to provide structural support to the optical assembly 121. The supporting plate 1200 may define a hole, and the hole is in optical communications with the second through hole 1216.

Figure 15:
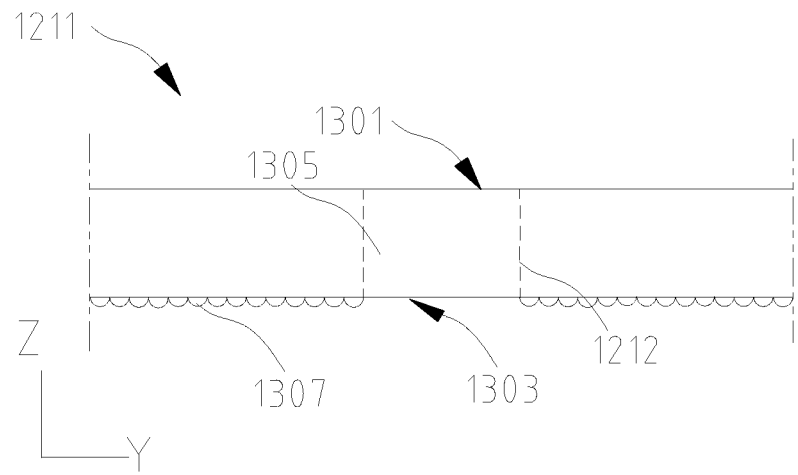
FIG. 15 is a cross-section view of an embodiment of a light guiding plate of a display assembly.

Referring to FIG. 15, the light guiding plate 1211 includes a first surface 1301, a second surface 1302 opposite the first surface 1301, and a light guiding media 1305 located between the first surface 1301 and the second surface 1302. The light guiding media 1305 allows the target signal "b" to be transmitted from the first surface 1301 to the second surface 1302. It should be understood that, a plurality of reflective arrays 1307 lines the second surface 1302 of the light guiding plate 1211, with the exception of the inner surface forming the path 1212 of the light guiding plate 1211. The reflective arrays 1307 are configured to spread the light in the light guiding plate 1211 to make the brightness of the light more uniform across the display 1 (not shown in FIG. 15). Since the inner surface of the path 1212 is not lined with the reflective arrays 1307, this can reduce the spreading and the reflection of the target signal "b" in the path 1212.

Referring back to FIG. 7, the first through hole 1218 is defined on the optical film 1210, the second through hole 1216 is defined on the reflecting film 1213, and the path 1212 is defined on the light guiding plate 1211. The optical film 1210 and the reflecting film 1213 should not be placed on the inner surface of the receiving channel 107 so that the spreading and the reflection of the target signal "b" can be reduced, and thereby reducing attenuation of the signal's energy in the receiving channel 107 and increasing efficiency of the identification by the signal receiver 3.

Figure 16:
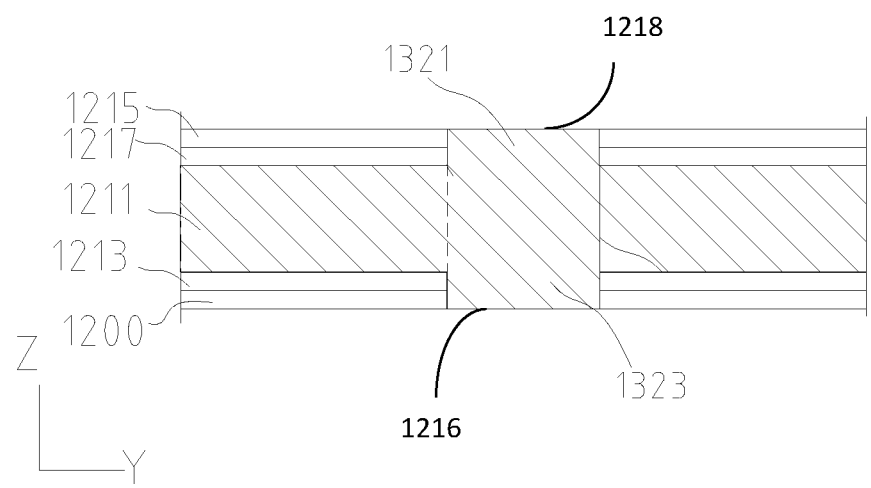
FIG. 16 is a cross-section view of an embodiment of an optical assembly of a display assembly.

Referring to FIG. 16, the light guiding plate 1211 includes a first light guiding piece 1321 and a second light guiding piece 1323 opposite to the first light guiding piece 1321. The first light guiding piece 1321 fills in the first through hole 1218. The second light guiding piece 1323 fills in the second through hole 1216. The first light guiding piece 1321 and the second light guiding piece 1323 use the same material as the light guiding media 1305. The first light guiding piece 1321 and the second light guiding piece 1323 have a high transmittance for the target signal "b".

The embodiment shown in FIG. 16 has at least two advantages. First, having the first light guiding piece 1321 fills in the first through hole 1218 and the second light guiding piece 1323 fills in the second through hole 1216, which can improve the structural strength and the flatness of optical assembly 121. Second, having the first through hole 1218 and the second through hole 1216 fitted over the first light guiding piece 1321 and the second light guiding piece 1323, respectively, enable the optical film 1210, the light guiding plate 1211, and the reflecting film 1213 to be quickly assembled.

Shape of the first guiding piece 1321 matches the shape and size of the first through hole 1218; and shape of the second guiding piece 1323 matches the shape and size of the second through hole 1216, such that the first light guiding piece 1321 fills in exactly the first through hole 1218, and the second light guiding piece 1323 fills in exactly the second through hole 1216.

Figure 17:
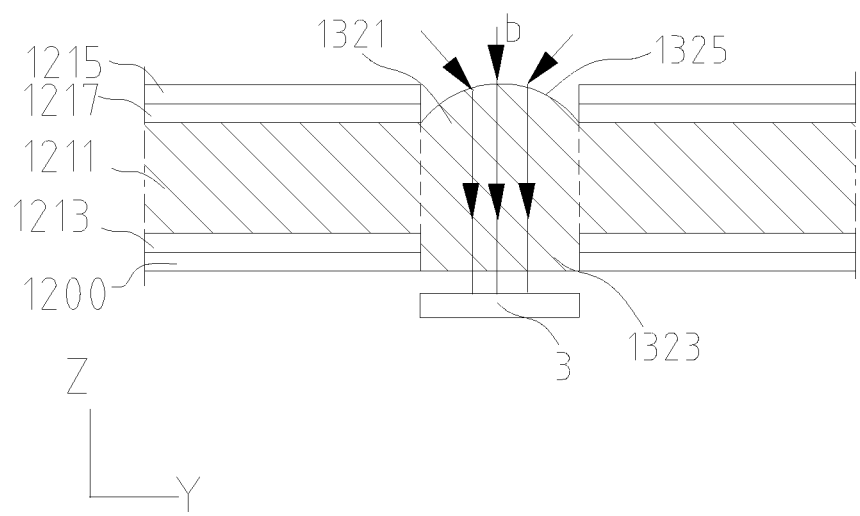
FIG. 17 is a cross-section view of another embodiment of an optical assembly of a display assembly.

FIG. 17 shows the cross-section view of another embodiment of an optical assembly. The first light guiding piece 1321 has a third surface 1325 configured to receive signal. The surface 1325 has a convex surface, protruding from the first light guiding piece 1321 to the display 1. In one hand, the surface 1325 can increase receiving area for the target signal "b". In another hand, the surface 1325 can make the target signal "b" to be converged to the signal receiver 3.

In some embodiments, the detection signal "a" and the target signal "b" may be optical signal. The signal receiver 3 may be a photosensor to convert the optical signal to the electronic signal.

Figure 18:
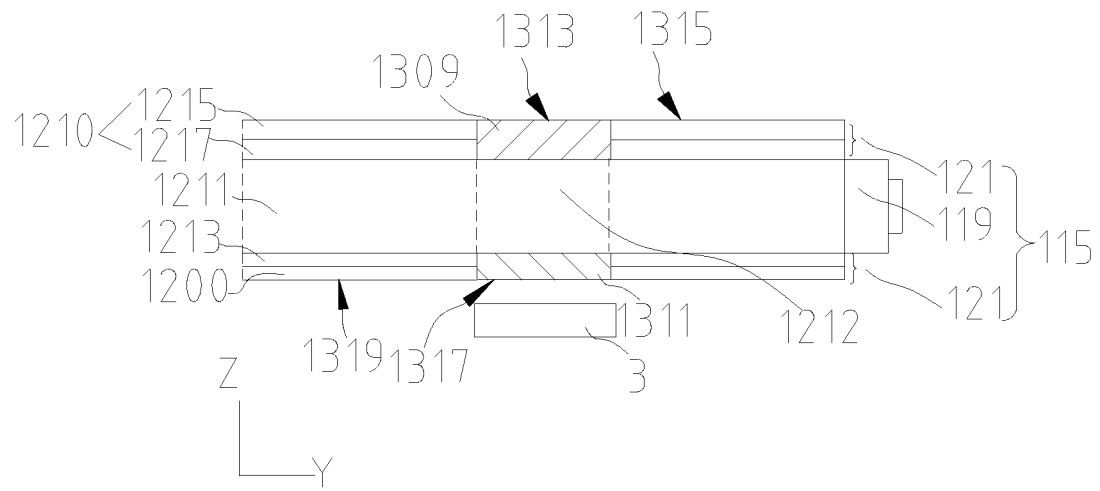
FIG. 18 is a cross-section view of yet another embodiment of an optical assembly of a display assembly.

Referring to FIG. 18 shows another embodiment of the present disclosure. The difference between the FIG. 18 and FIG. 7 is that, the optical assembly 121 includes a first photic element 1309 and a second photic element 1311. The first photic element 1309 is filled in the first through hole 1218. The second photic element 1311 fills in the second through hole 1216. It should be understood that, the detection signal "a" may be the optical signal, the first photic element 1309 and the second photic element 1311 have high transmittance for to the detection signal "a".

If the target signal "b" is infrared light, the first photic element 1309 and the second photic element 1311 are made of material with high transmittance material for infrared light and visible light. The time when transmitting the target signal "b" can reduce the influence of display brightness on display 1.

The first photic element 1309 is fills in exactly the first through hole 1218. The second photic element 1311 is fills in exactly the second through hole 1216. The first photic element 1309 and the second photic element 1311 may be connected to the optical film 1210 and the reflecting film 1213, respectively, to increase structure strength of the optical film 1210 and the reflecting film 1213.

The fourth surface 1313 is the surface of the first photic element 1309 located away from the light guiding plate 1211. A fifth surface 1315 is the surface of the optical assembly 121 located away from the light guiding plate 1211. The fourth surface 1313 is aligned with the fifth surface 1315. A sixth surface 1317 is the surface of the second photic element 1311 located away from the light guiding plate 1211. A seventh surface 1319 is the surface of the reflecting film 1213 located away from the light guiding plate 1211. The sixth surface 1317 is aligned with the seventh surface 1319. In this, the surface of the optical film 1210 will be flatter and reflectivity of the reflecting film 1213 may be increased.

Figure 19:
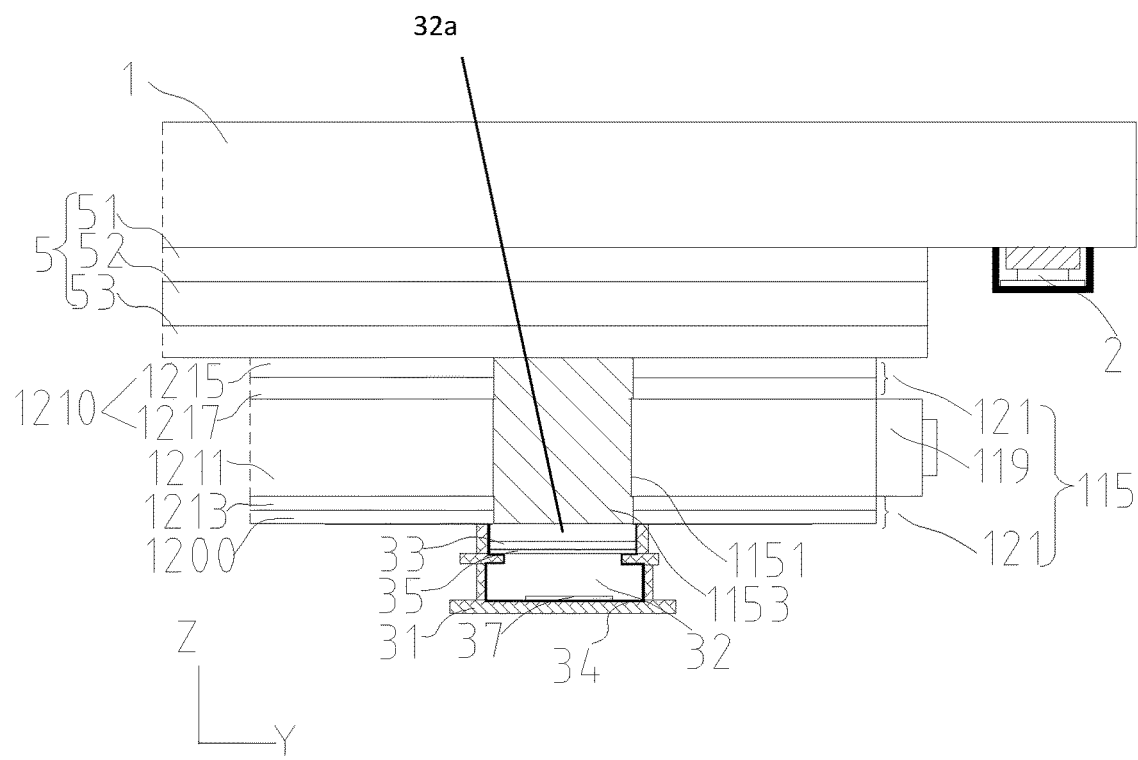
FIG. 19 is a cross-section view of an embodiment of the display assembly.

Referring to FIG. 19, the difference between the FIG. 19 and FIG. 7 is that, the backlight module 115 defines a third through hole 1151. The third through hole 1151 passes through the optical assembly 121. The third through hole 1151 forms the receiving channel 107. The backlight module 115 includes a pillar 1153 configured to guide light. The pillar 1153 is received in the third through hole 1151 to transmit the target signal "b".

The shape and size of the pillar 1153 and the third through hole 1151 are the same, so that the pillar fills in exactly the third through hole 1151. The pillar 1153 may be located in other areas except the backlight module 115, so that the transmission of target signal "b" is not affected by other signal transmission.

FIGS. 15-19 are different embodiments of the present disclosure about improvement for the backlight module 115. The structures of the receiving channel 107 described in FIGS. 15-19 may be applied to the radiating channel 102 in FIG. 8 and the signal transmission channel 104 in FIG. 10.

Referring to FIG. 19, the signal receiver 3 includes a holder 31, a focusing lens 33, a filter 35, and a sensor 37. The holder 31 is connected to the optical assembly 121. The holder 31 defines a receiving groove 32. The focusing lens 33, the filter 35, and the sensor 37 are received in the receiving groove 32. The focusing lens 33 is much close to the second through hole 1216 relative to the filter 35. Referring to FIG. 19 and FIG. 7, an opening 32a on the receiving groove 32 is in optical communications with the second through hole 1216, so that the target signal "b" can pass through the first through hole 1218, the path 1212, the second through hole 1216, the opening 32a, the focusing lens 33, and the filter 35 until the target signal "b" is transmitted to the sensor 37.

It should be understood that the focusing lens 33 is an optional component of the signal receiver. In some embodiments where the focusing lens is used, the focusing lens 33 is configured to focus the target signal "b" to the sensor 37. The filter 35 is configured to filter out all light signals except for the target signal "b", so that the sensor 37 can receive all or most of the target signal "b" and improve the effectiveness of reading the identification surface.

Size of the opening 32a may be or equal or larger than the size of the second through hole 2126.

In some embodiment, the focusing lens 33 and the sensor 37 may be parts of separate components.

Referring to FIG. 19, the inner surface forming the receiving groove 32 has a light blocking layer 34. The light blocking layer 34 is configured to prevent the target signal "b" from leaving the receiving groove 32 and other signals from entering into the receiving groove 32, thereby reducing signal noise and improving the effectiveness of reading the identification surface.

Figure 20:
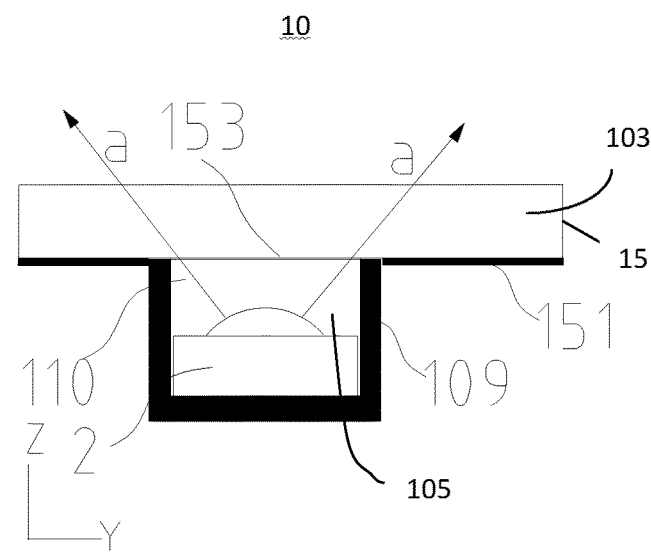
FIG. 20 is a cross-section view of a signal transmitter of a display assembly according to an embodiment.

Referring to FIG. 20, the display assembly 10 includes a light blocking element 109. The light blocking element 109 defines a receiving space 110. The signal transmitter 2 is located in the receiving space 110. The cover 103 covers on the opening of the receiving space 110. The radiating channel 105 is located between the signal transmitter 2 and the cover 103. The light blocking element 109 is configured to prevent the detection signal "a" from leaving the radiating channel 105 via unintended paths, so that the attenuation of the detection signal "a" transmission in the radiating channel 105 can be reduced, thereby increasing the like likelihood of successfully reading the identification surface.

In embodiments where the detection signal "a" is infrared light, the light blocking element 109 may be made of materials with low infrared light transmission (for example, a material could be used so that the infrared light transmitted through the material is no more than 1 to 10%). The light blocking element 109 may have defined thereon a through hole or groove, wherein the optical element may be. A part of the signal transmitter 2 and the cover 103 may make up the radiating channel 105 for the detection signal "a" to travel through.

It should be understood that, the second area 15 of the cover 103 has an ink layer 151. The ink layer 151 includes a photic portion 153. The photic portion 153 is aligned to the radiating channel 105 to allow the detection signal "a" leave the radiating channel 105 via the photic portion 153. Furthermore, the photic portion 153 should be separated from the identification area 11. In one example, the distance between the photic portion 153 and the identification area 11 is about 5 to 15 mm.

In some embodiments, the light blocking element 109 may be connected to the cover 103. The signal transmitter 2 may be fixed in the light blocking element 109 to connect the signal transmitter 2 to the cover 103.

Figure 21:
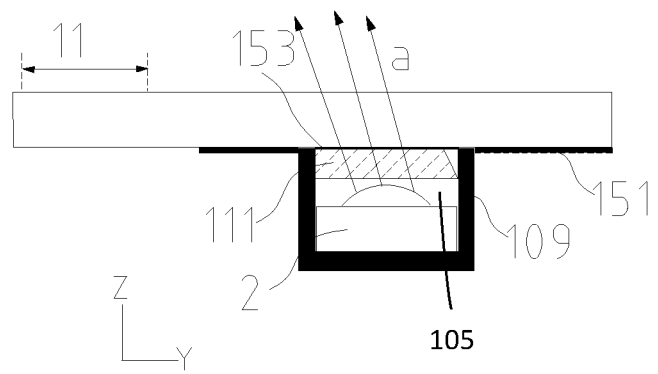
FIG. 21 is a cross-section view of a signal transmitter signal transmitter of a display assembly according to an embodiment.

Referring to FIG. 21, the display assembly 10 includes the light guiding element 111. The light guiding element 111 is located in the radiating channel 105. One end of the light guiding element 111 is connected to the cover 103, while the other end of the light guiding element 111 is connected to the signal transmitter 2. The light guiding element 111 is configured to transmit the detection signal "a" in a manner that concentrates the detection signal "a" in a particular direction as it exits the cover 103. Furthermore, the light guiding element 111 can extend in a direction not perpendicular to the cover plate 103 so that the detection signal "a" exits in a direction inclined toward the identification area 11.

In some embodiments, the signal transmitter 2 may be an infrared light emitting diode and the light guiding element 111 may be an optical element for transmitting infrared light. For example, the light guiding element 111 may be a collimator configured to adjust the direction of the infrared light so as to make a detection angle of the infrared light more concentrated. The light guiding element 111 and the signal transmitter 2 may be preinstalled in the light blocking element 109 to form a modular component that can be more easily assembled with other components.

Figure 22:
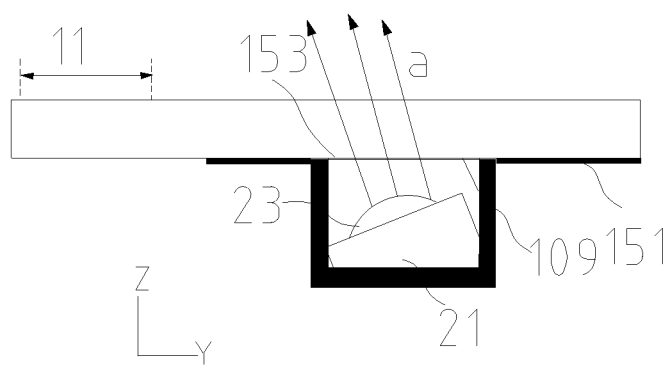
FIG. 22 is a cross-section view of a signal transmitter signal transmitter of a display assembly according to an embodiment.

Referring to FIG. 22, the signal transmitter 2 includes a base 21 and a radiated end 23 on the base 21. The radiated end 23 of the signal transmitter 2 is configured to project the detection signal "a" in a direction toward the cover 103 and the base 21 is configured to house the component that produces the detection signal "a". The direction that the detection signal "a" is radiating intersects the plane of the cover 103. That is, the signal transmitter 2 is tilted in a way that the detection signal "a" exit the cover 103 at an inclined angle.

In some embodiments, the angle between the detection signal "a" and the normal line of the cover 103 is from 45 to 60 degrees.

As such, when the identification surface F1 of the object F is placed over the identification area 11, the detection signal "a" enters the object F at an inclined angle, which facilitates reflecting the detection signal "a" in the object F toward the direction of the identification area 11. This can increase the intensity of the detection signal "a" as it leaves the identification area 11 and enters the signal receiver 3, thereby improving effectiveness of the likelihood of a successful identification. Additionally, when the detection signal "a" enters the object F at an incident angle, this can increase the area of the incident area F2 and the area of departure (that is, the portion of the identification area 11 that the detection signal "a" travels into), so that the area of the identification surface F1 used in identifying the object F is also increased.

Figure 23:
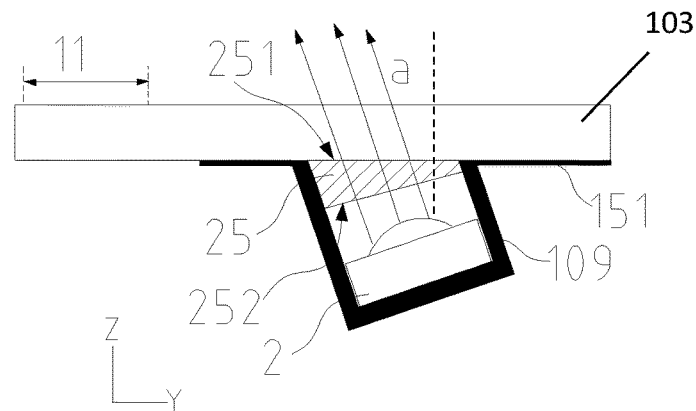
FIG. 23 is a cross-section view of a signal transmitter signal transmitter of a display assembly according to an embodiment.

Referring to FIG. 23, the signal transmitter 2 includes an optical stage 25. The optical stage 25 includes a first surface 251 and a second surface 251 inclined to the first surface 251. The first surface 251 is configured with its face approximately parallel to the cover 103 and the second surface 252 is configured to face the signal transmitter 2.

Figure 24:
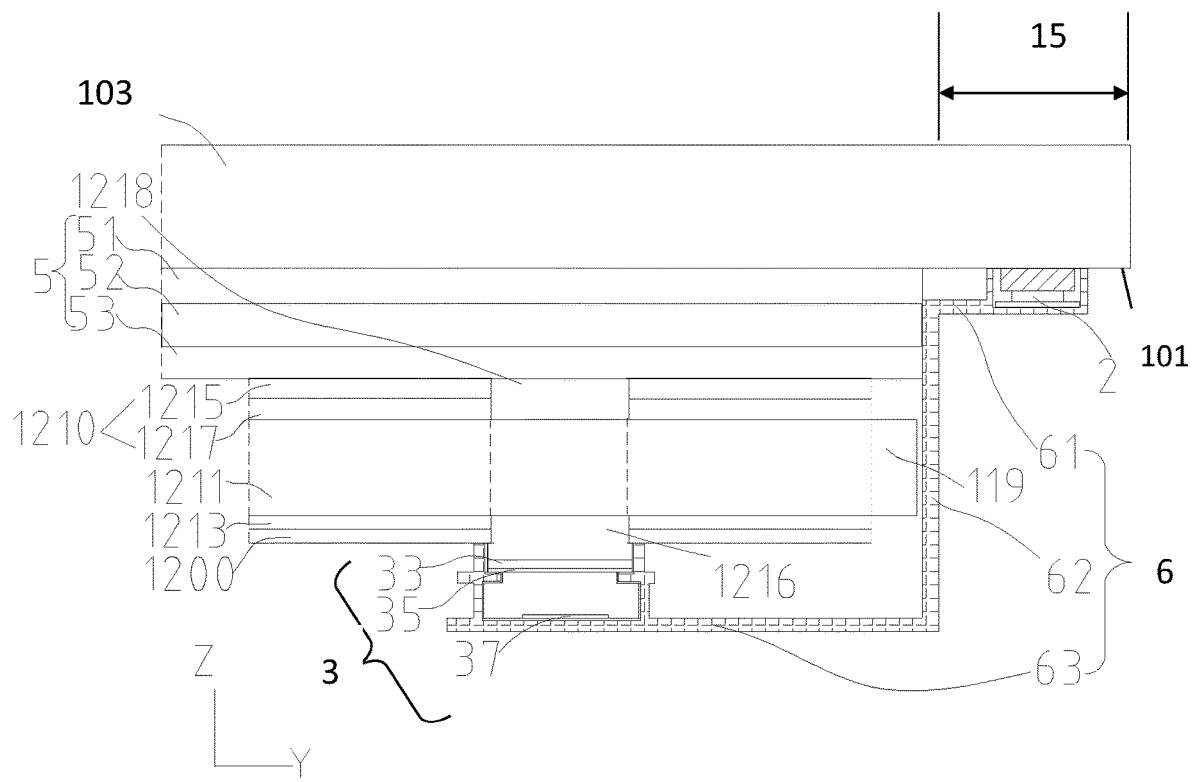
FIG. 24 is a top view of a display assembly of an electronic device according to an embodiment.

In some embodiments, the optical stage 25 has a high transmittance for detection signal "a" (for example, the transmittance is about 70 to 95%). The optical stage 25 and the signal transmitter 2 may be placed in a groove or through hole of the light blocking element 109, and the signal transmitter 2 is arranged to face the second surface 252 of the optical stage 25. The second surface 252 of the optical stage 25 may be positioned so that it is in contact with the signal transmitter 2, or a certain gap can be left between the second surface 252 and the signal transmitter 2. An angle is set between the first surface 251 and the second surface 252, so that when the first surface 251 is attached to the cover 103, the signal transmitter 2 will face the cover 103 at an angle of incline. Thus, the use of the optical stage 25 enables easily setting the angle of incline to a predetermined angle during assembly. Referring to FIG. 24. The display assembly 10 includes a fixing component 6. The fixing component 6 is connected to the signal transmitter 2, the display component 101, and the signal receiver 3.

In FIG. 24, the fixing component 6 includes a first bracket 61, a second bracket 62, and a third bracket 63. The first bracket 61 surrounds the signal transmitter 2 and is attached to the second area 15 of the cover 103. The second bracket 62 extends along an edge of the display component 101. The third bracket 63 surrounds the signal receiver 3 and is attached to a side of the display component 101 away from the cover 103.

Figure 25:
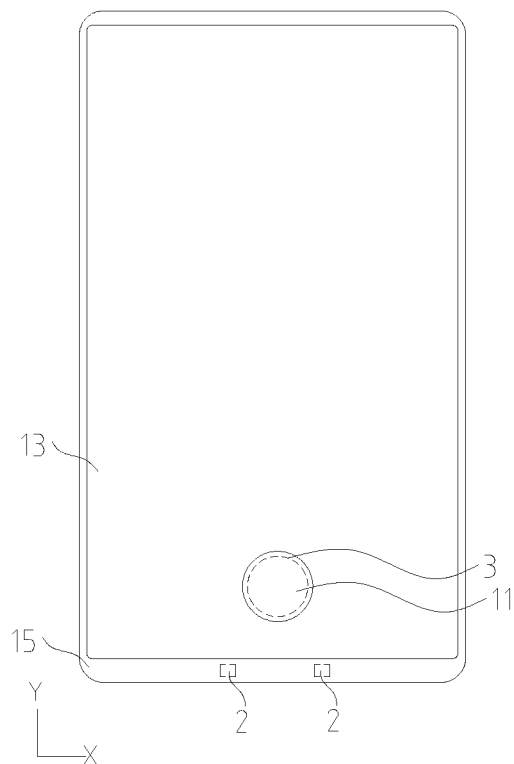
FIG. 25 is a top view of a display assembly of an electronic device according to an embodiment.
Figure 26:
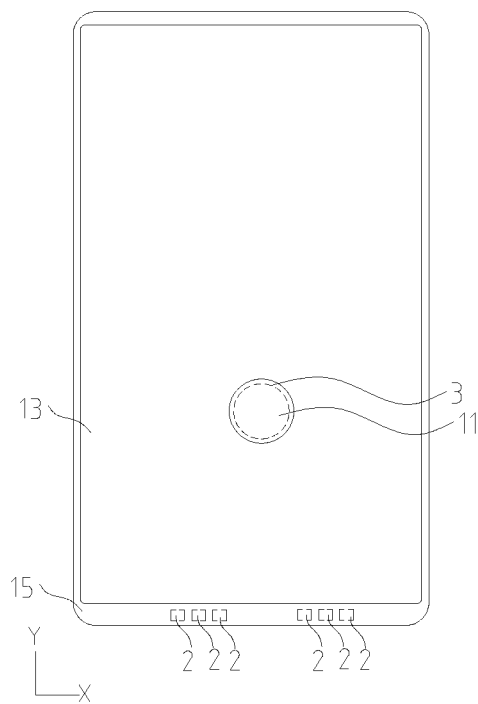
FIG. 26 is a top view of a display assembly of an electronic device according to an embodiment.

According to an embodiment shown in FIG. 25 and FIG. 26, there may be a plurality of the signal transmitter 2. In the example shown in FIG. 25, the two signal transmitter 2 are located on opposite sides of the signal receiver 3 and are equidistant to the signal receiver 3. In this example, each signal transmitter 2 produces the detection signals "a", which can be produced simultaneously and combined together to strengthen the combined detection signals "a" and the target signals "b" so as to improve the effectiveness of reading the identification surface.

It should be understood that, there may be more than two signal transmitter 2. FIG. 26 shows another example of a display assembly having multiple signal transmitters 2. Here, the signal transmitters 2 are located on opposite sides of the signal receiver 3. The more signal transmitters 2 there are, the stronger the signal strength of the combined detection signal "a" will be, which will allow the identification area 11 to be placed further away from the signal transmitters 2; so that when the signal transmitters 2 are located at the second area 15 of the display 1, the identification area 11 can be flexibly placed at the center of the first area 13 or far away from the signal transmitters 2.

Figure 27:
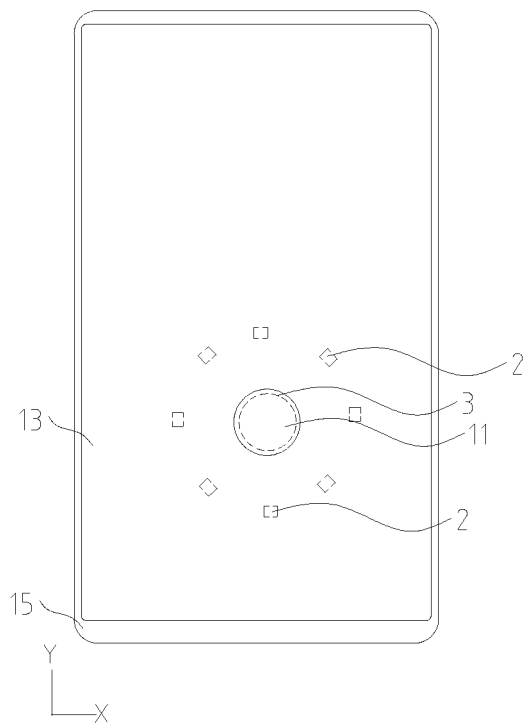
FIG. 27 is a top view of a display assembly of an electronic device according to an embodiment.
Figure 28:
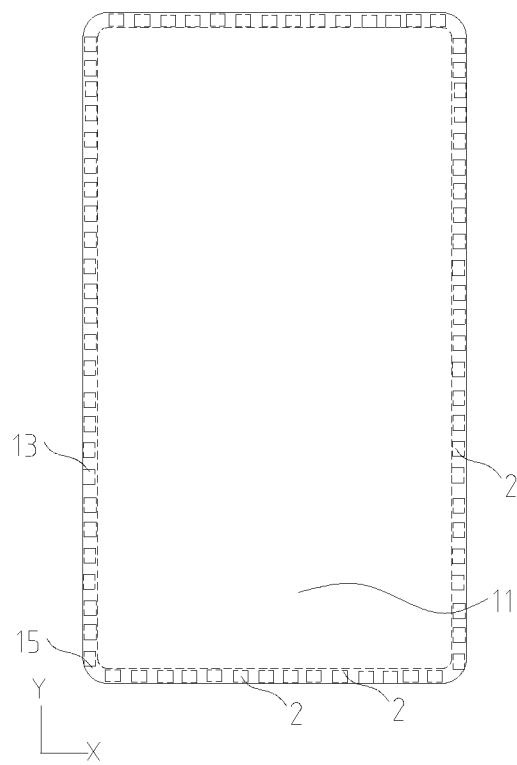
FIG. 28 is a top view of a display assembly of an electronic device according to an embodiment.

FIG. 27 illustrates another example of a display assembly having multiple signal transmitters 2. Here, the signal transmitters 2 are placed surrounding the peripheral region of the signal receiver 3. In some embodiments, as shown in FIGS. 25 and 26, the identification area 11 may be a part of the first area 13. In some other embodiments, as shown in FIG. 28, the identification area 11 may be the entirety of the first area 13.

The above-described embodiments are merely illustrative of several embodiments of the present disclosure, and the description thereof is specific and detailed. The above embodiments cannot be construed to limit the present disclosure. It should be noted that, a number of variations and modifications may be made by those skilled in the art without departing from the spirit and scope of the disclosure. Therefore, the scope of the present disclosure should be subject to the appended claims.

Figure 29:
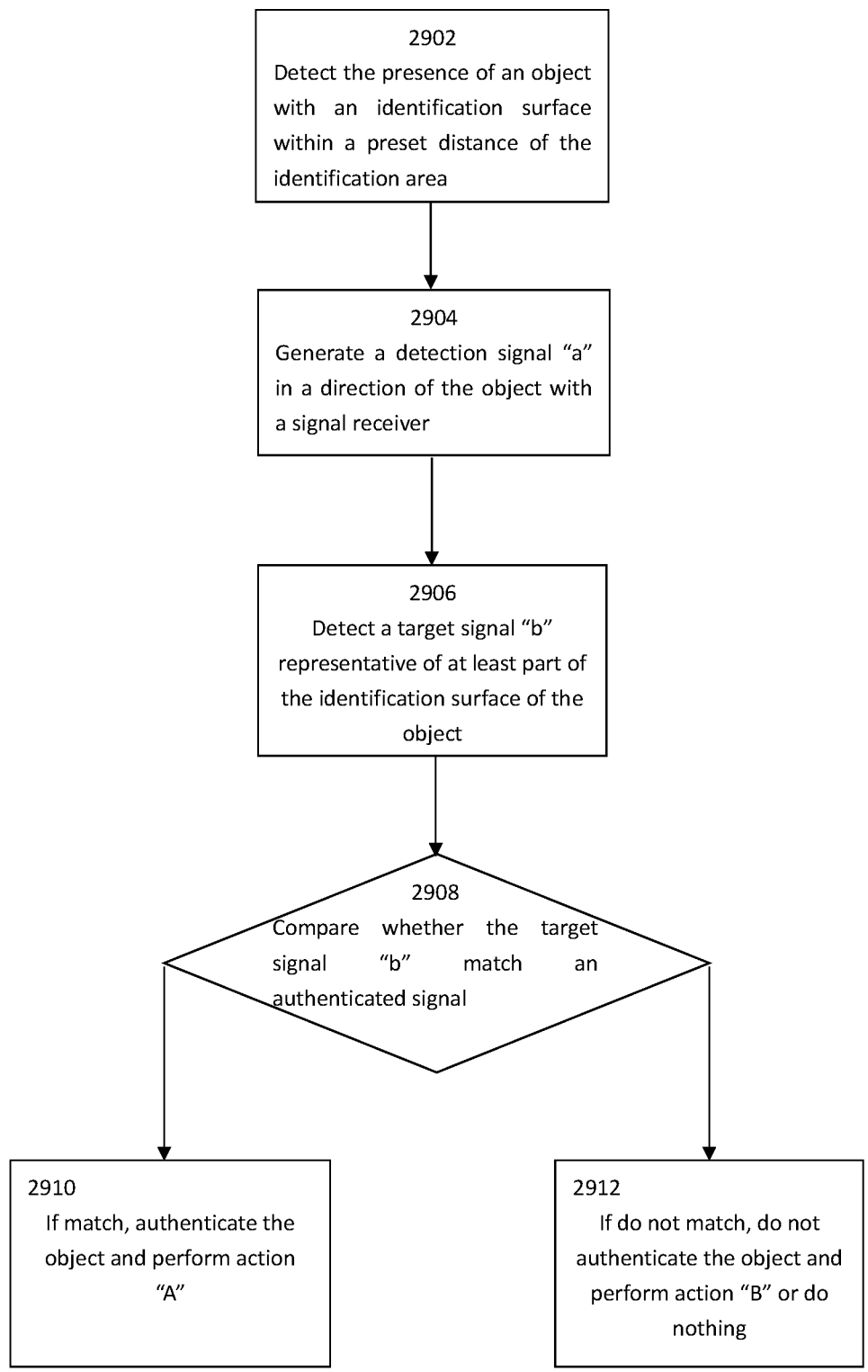
FIG. 29 is a flowchart of a method of detecting an identification surface of an object using a display assembly according to an embodiment.

FIG. 29 is a flowchart for a method of detecting an identification surface of an object using an electronic device that has a display assembly according to one of the earlier discussed embodiments. In some embodiments, when an object (such as a finger) is placed within a preset distance of the identification area of the display assembly, the presence of the object is detected 2902 and the signal transmitter is triggered to generate 2904 a detection signal "a" in the direction of the object. The detection signal "a" should be operable to penetrate the object, reflect within the object and project a target signal "b" representative of the identification surface onto the identification area of the display assembly. The target signal "b" is then detected 2906 by a signal receiver.

As previously discussed, the detection signal "a" may come in many forms. In some embodiments, the detection signal "a" may be an infrared light. In other embodiments, the detection signal "a" may be visible light, ultraviolet light, ultrasonic signal, etc. The theory underlying how the detection signal "a" reflect within the object and project a target signal "b" onto the identification area is discussed in detail in the description of FIG. 3. The process and components used for triggering an electronic device upon detecting an object within a preset distance is generally well-known to persons skilled in the art and will not be elaborated here.

In some embodiments, an electronic device may take further steps to process and utilize the detected target signal "b". For example, where the target signal "b" is used for authentication, the target signal "b" may be compared 2908 to an authenticated signal representative of the identification surface of an object that has been previously registered and stored in a computer memory. If the target signal "b" matches the authenticated signal, the electronic device may authenticate the object and perform one or more actions (i.e., action "A") 2910, such as unlocking the electronic device, granting access to restricted data, or allowing certain transactions to take place via the electronic device. On the other hand, if the target signal "b" does not match the authenticated signal, the electronic device may not authenticate the object and disregard the authentication attempt or take one or more other actions (i.e., action "B") 2912 such as send out an alert notifying a user that the authentication attempt failed, prompting the user to retry authentication, or locking down the device.

Figure 30:
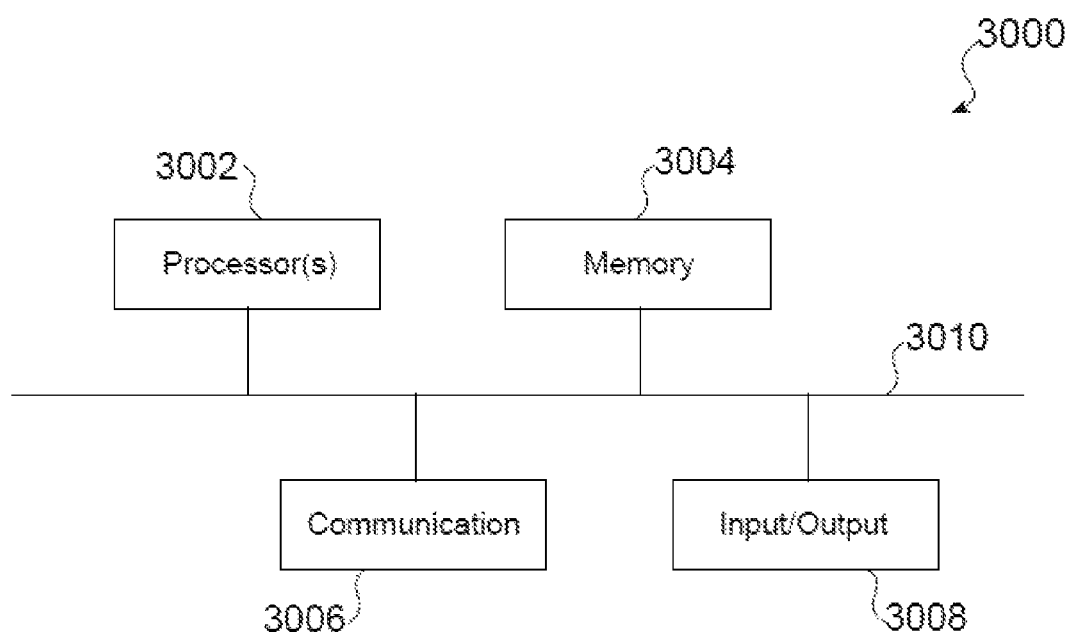
FIG. 30 is high-level block diagram showing an example of a processing system as part of an electronic device according to an embodiment.

FIG. 30 is a high-level block diagram showing an example of a processing system 3000 that can be a part of the electronic device described herein. The electronic device may include two or more processing systems such as represented in FIG. 30, which may be coupled to each other via a network or multiple networks.

In the illustrated embodiment, the processing system 3000 includes one or more processors 3002, memory 3004, a communication device 3006, and one or more input/output (I/O) devices 3008, all coupled to each other through an interconnect 3010. The interconnect 3010 may be or include one or more conductive traces, buses, point-to-point connections, controllers, adapters and/or other conventional connection devices. The processor(s) 3002 may be or include, for example, one or more general-purpose programmable microprocessors, microcontrollers, application specific integrated circuits (ASICs), programmable gate arrays, or the like, or a combination of such devices. The processor(s) 3002 control the overall operation of the processing system 3000. Memory 3004 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 3004 may store data and instructions that configure the processor(s) 3002 to execute operations in accordance with the techniques described above. The communication device 3006 may be or include, for example, an Ethernet adapter, cable modem, Wi-Fi adapter, cellular transceiver, Bluetooth transceiver, or the like, or a combination thereof. Depending on the specific nature and purpose of the processing device 3000, the I/O devices 1108 can include devices such as a display (which may be a touch screen display), audio speaker, keyboard, mouse or other pointing device, microphone, camera, etc.

What is claimed is:

1. A display assembly adapted for detecting an identification surface of an object, comprising:
a display defining an identification area;
a signal transmitter positioned on a first side of the display and configured to, when the object is within a preset distance of the identification area from a second side of the display, generate, in a direction of the object, a detection signal operable to penetrate the object and reflect a target signal representative of at least part of the identification surface on the identification area, wherein the signal transmitter includes an optical stage having a first surface facing the first side of the display and a second surface inclined to the first surface; and
a signal receiver adjacent to the signal transmitter and configured to, when the target signal is reflected on the identification area, detect the target signal,
wherein the signal transmitter is a first transmitter, and wherein the display assembly further comprises a second signal transmitter, and wherein the signal receiver is positioned between the first transmitter and the second transmitter.

2. The display assembly of claim 1, wherein the display comprises:
a cover having defined thereon the identification area and comprising at least part of an outer surface of the display;
a display component positioned between the cover and the signal receiver;
a radiating channel, positioned between the signal transmitter and the cover, operable to transmit the target signal; and
a receiving channel, positioned between the signal receiver and the identification area, operable to transmit the detection signal.

3. The display assembly of claim 2, wherein the signal transmitter is positioned adjacent to the display component, and a distance between the signal transmitter and the cover is less than or equal to a distance between the signal receiver and the cover.

4. The display assembly of claim 2, further comprising:
a backlight module positioned between the display component and the signal receiver, wherein the radiating channel and the receiving channel pass through in the backlight module.

5. The display assembly of claim 4, wherein the backlight module comprises:
an optical assembly; and
a light source transmitting a light signal from the optical assembly to the cover.

6. The display assembly of claim 5, wherein the optical assembly comprises:
an optical film having defined thereon a first through hole;
a light guiding plate having defined thereon a path;
a reflecting film having defined thereon a second through hole; and
the first through hole, the path, and the second through hole form the receiving channel.

7. The display assembly of claim 6, wherein the light guiding plate comprises:
a first surface;
a second surface opposite the first surface; and
a light guiding media in the path between the first surface and the second surface.

8. The display assembly of claim 7, wherein:
the first through hole is filled by a first light guide piece; and
the second through hole is filled by a second light guide piece.

9. The display assembly of claim 6, wherein the backlight module further comprises:
a first photic element filled in the first through hole, operable to fix the optical film; and
a second photic element filled in the first through hole, operable to fix the reflecting film.

10. The display assembly of claim 6, wherein the signal receiver comprises:
a holder, a focusing lens, a filter, and a sensor;
wherein the holder defines a receiving groove;
wherein the focusing lens, the filter, and the sensor are located in the receiving groove;
wherein the receiving groove is in optical communications with the second through hole; and
wherein the target signal is transmitted to the sensor via the first through hole, the path, the second through hole, and the focusing lens.

11. The display assembly of claim 10, further comprising a light blocking layer defined on an inner surface of the holder and configured to prevent the target signal from leaving the holder.

12. The display assembly of claim 4, wherein the display component further comprises a liquid crystal module, the liquid crystal module is located between the cover and the backlight module.

13. The display assembly of claim 2, further comprising a light blocking element, wherein the light blocking element defines a receiving space, the signal transmitter is received in the receiving space to reduce energy loss of the detection signal in the radiating channel.

14. The display assembly of claim 13, further comprising a light guiding element mounted between the cover and the signal transmitter; the light guiding element being configured to transmit the detection signal along a direction of the light guiding element.

15. The display assembly of claim 13, wherein the signal transmitter comprises:
a base; and
an emitter mounted to the base and configured to transmit the detection signal in a direction perpendicular to the plane of the cover.

16. The display assembly of claim 1, wherein the target signal is an orthographic projection of the detection signal representative of at least part of the identification surface on the identification area.

17. The display assembly of claim 1, wherein:
the first surface is configured to face approximately parallel to a cover;
and the second surface is configured to face the signal transmitter.

18. The display assembly of claim 1, wherein:
the optical stage has a transmittance ranging from 70% to 95%;
the optical stage and the signal transmitter are placed in a groove or a through hole of a light blocking element.

19. The display assembly of claim 1, wherein the second surface of the optical stage is positioned so that it is in contact with the signal transmitter.

20. The display assembly of claim 1, wherein the second surface of the optical stage is positioned to form a gap between the second surface and the signal transmitter.

21. A method of detecting an identification surface of an object using a display assembly having a display with an identification area thereon, comprising:
when the object is within a preset distance of the identification area from a side of the display, generating with a signal transmitter, in a direction of the object, a detection signal operable to penetrate the object and reflect a target signal representative of at least part of the identification surface on the identification area; and
detecting the target signal with a signal receiver,
wherein the signal transmitter is a first transmitter, and wherein the display assembly further comprises a second signal transmitter, and wherein the signal receiver is positioned between the first transmitter and the second transmitter, and
wherein the signal transmitter includes an optical stage having a first surface facing the first side of the display and a second surface inclined to the first surface.

22. An electronic device with a display assembly adapted for detecting an identification surface of an object, comprising:
a display defining an identification area;
a signal transmitter positioned on a first side of the display and configured to, when the object is within a preset distance of the identification area from a second side of the display, generate, in a direction of the object, a detection signal operable to penetrate the object and reflect a target signal representative of at least part of the identification surface on the identification area; and
a signal receiver adjacent to the signal transmitter and configured to, when the target signal is reflected on the identification area, detect the target signal,
wherein the signal transmitter is a first transmitter, and wherein the display assembly further comprises a second signal transmitter, and wherein the signal receiver is positioned between the first transmitter and the second transmitter, and
wherein the signal transmitter includes an optical stage having a first surface facing the first side of the display and a second surface inclined to the first surface.

23. The electronic device of claim 22, wherein the display comprises:
a cover having defined thereon the identification area and comprising at least part of an outer surface of the display;
a display component positioned between the cover and the signal receiver;
a radiating channel, positioned between the signal transmitter and the cover, operable to transmit the target signal; and
a receiving channel, positioned between the signal receiver and the identification area, operable to transmit the detection signal.

24. The electronic device of claim 22, further comprising:
a computer memory configured to store data representative of an authenticated signal; and
a processor electrically connected to the computer memory, configured to control the electronic device to authenticate the object if the target signal matches the authenticated signal.

* * * * *